United States Patent [19]

Gertel et al.

[11] Patent Number: 5,348,266
[45] Date of Patent: Sep. 20, 1994

[54] REDUCED HORIZONTAL STIFFNESS VIBRATION ISOLATION SYSTEM

[75] Inventors: Maurice Gertel, Chestnut Hill; Robert G. Haynes, Woburn, both of Mass.

[73] Assignee: Kinetic Systems, Inc., Boston, Mass.

[21] Appl. No.: 858,569

[22] Filed: Mar. 27, 1992

[51] Int. Cl.⁵ .................................. F16M 11/00
[52] U.S. Cl. ..................... 248/562; 248/636; 248/619; 267/64.21; 188/378
[58] Field of Search ............... 248/630, 615, 622, 621, 248/632, 634, 638, 562, 618–619; 267/140.4, 35, 64.27, 64.21, 122; 188/378

[56] References Cited

U.S. PATENT DOCUMENTS

| | | | |
|---|---|---|---|
| 3,826,507 | 7/1974 | Brand et al. | 267/35 X |
| 4,211,429 | 7/1980 | Howard | 267/35 X |
| 4,518,154 | 5/1985 | Merkle | 267/64.27 X |
| 4,533,109 | 8/1985 | Delam | 248/618 X |
| 4,679,775 | 7/1987 | Funaki et al. | 267/64.27 |
| 4,688,774 | 8/1987 | Warmuth, II | 267/35 X |
| 4,911,416 | 3/1990 | Warmuth, II | 267/64.21 X |
| 5,135,203 | 8/1992 | Wijnhoven et al. | 267/64.21 |

FOREIGN PATENT DOCUMENTS 1232121  5/1971  United Kingdom ............ 267/64.27

Primary Examiner—Karen J. Chotkowski
Attorney, Agent, or Firm—Joseph S. Iandiorio; Kirk Teska

[57] ABSTRACT

A reduced horizontal stiffness vibration isolation system including a gas spring assembly with a load support interface portion and pivot device externally coupled to the gas spring assembly for allowing the gas spring assembly to pivot when either the load support interface portion or the pivot device is displaced to reduce the horizontal stiffness of the gas spring assembly.

12 Claims, 3 Drawing Sheets

REDUCED HORIZONTAL STIFFNESS VIBRATION ISOLATION SYSTEM

FIELD OF INVENTION

This invention relates to a reduced horizontal stiffness vibration isolation system in which a resilient vibration damper is externally coupled to a gas spring assembly for providing a rocking or pivoting motion in the gas spring assembly.

BACKGROUND OF INVENTION

Often, critical or very sensitive measurements must be made in a laboratory or on the manufacturing floor of a building wherein precision table top equipment such as electron microscopes and other microprecision equipment or machines are used for research, manufacturing, and quality control. Vibrations would otherwise adversely affect such equipment and hence vibration isolation systems are incorporated to suppress the vibrations and shocks occurring in the area the measurements are to take place. The vibrations may be the result of the natural frequency of the surrounding structure or due to extraneous elements such as rotating machinery or even other man made vibrations which enter the structural skeleton of the building and are subsequently transmitted throughout the building. Vibrations will be transmitted to the precision equipment at various frequencies and the vibrations will have both vertical and horizontal components.

Air or gas springs incorporated into vibration isolation system mounts are known which include convoluted diaphragm seal and piston type springs as well as conventional bellows type airsprings.

These types of vibration isolation systems adequately provide vibration attenuation in the axial (vertical) direction. Axial vibration isolation is achieved in general by lowering the stiffness of the system in the axial direction to the extent that the system will still support the table top, platform, or other surface on which the precision equipment is located.

The object of these systems is to reduce the natural frequency and the stiffness of the mount and thereby increase the efficiency of vibration isolation. In a convolution air seal piston type vibration isolator, the natural frequency is a function of the air volume, the load support interface area, and the static load pressure.

Unfortunately, however, most of these types of airsprings are inherently stiff in the horizontal direction. As a consequence, vibration isolation is significantly less efficient horizontally than for the vertical direction.

Accordingly, different techniques have been employed to improve horizontal vibration isolation in air or gas springs. For example, one notable improvement, U.S. Pat. No. 4,223,762, employs a floating member within the piston of a convoluted diaphragm seal arrangement. Inner floating balls that ride in a hardened ball race of the floating member reduce vibrations in a direction orthogonal to the axis of the airspring while the airspring itself reduces vibration in the direction along the axis of the airspring. Alternatively, the floating member may be connected to one end of the airspring cylinder.

Other techniques to reduce horizontal vibration employ various modification of the piston itself including adding cables or rods to a hollow piston (U.S. Pat. No. 3,784,146) or a concentric load supporting rod pivotably engaging the bottom of a well of the piston (U.S. Pat. No. 4,360,184) which permits gimbel like rotation of the piston for horizontal movement of the load.

As can be appreciated, each of these devices used to isolate the horizontal component of vibrations transmitted to the air piston assembly require substantial mechanical structure and intricate and generally close tolerance or precision fabrication techniques.

One other prior technique employs a multilaminazed rubber and stabilizing plate assembly integrally connected to a bellows type airspring (U.S. Pat. No. 5,018,701). Because the focus of this teaching is for earthquake vibration isolation of a floor structure, vertical guide post are used to restrain displacement of the airspring only in the vertical direction. Accordingly, when used in a load support system with multiple supports, the rubber laminate assembly is only displaceable in the vertical or horizontal direction. Unfortunately, this configuration does not allow the airspring assembly itself to be displaced other than directly in compression in the vertical direction. That is, the airspring can not be deflected horizontally nor can it rock or pivot or rotate along or about its vertical axis. Thus, the horizontal stiffness at the load support interface is governed exclusively by the horizontal shear stiffness of the rubber laminate assembly. Also, like the other art discussed above, substantial structure and additional component parts are required in such a design.

SUMMARY OF INVENTION: I

It is therefore an object of this invention to provide a reduced horizontal stiffness vibration isolation system.

It is a further object of this invention to provide such a reduced horizontal stiffness vibration isolation system which improves horizontal vibration isolation without reconfiguring of any part of a conventional air or gas spring.

It is a further object of this invention to provide such a reduced horizontal stiffness vibration isolation system which improves horizontal vibration isolation without the need for additional mechanical structure or intricate generally high tolerance fabrication techniques.

It is a further object of this invention to provide such a reduced horizontal stiffness vibration isolation system which allows the air or gas spring to pivot thereby effectively, inexpensively, and efficiently reducing the horizontal stiffness of the air or gas spring at the load interface portion of the spring.

This invention results from the realization that reduced horizontal stiffness of a vibration isolation system which utilizes a gas or airspring assembly is achieved by coupling the gas spring assembly with a stable pivot means which allows the gas spring assembly to pivot when either the pivot means and/or the load support interface portion of the gas spring is displaced laterally thereby reducing the effective horizontal stiffness at the load support interface of the gas spring.

This invention may be accomplished by a reduced horizontal stiffness vibration isolation system wherein pivot means are externally coupled to a gas spring assembly including a load support interface portion. Since the pivot means is configured to provide a pivoting motion of the gas spring assembly when either the load support interface or the pivot means is displaced in a direction other than along the vertical axis of the gas spring, the horizontal stiffness of the gas spring assembly is reduced thereby achieving improved horizontal vibration isolation in a gas spring otherwise inherently stiff in the horizontal direction.

The pivot means may include a plurality of resilient elastomeric members and may also include rigid members disposed between each pair of elastomeric members. The elastomeric members and the rigid members may be washer-shaped. The gas spring assembly may be a rolling convolution type airspring with a piston residing on a rolling convolution type flexible gas seal sealing the piston with respect to an air cylinder. Furthermore, the outer face of the first or top washer-shaped elastomeric member may be received partially within the housing of the airspring assembly. The outer face of the lowermost washer-shaped elastomeric member may be coupled to a rigid seat member, and additional air chambers may be incorporated for increasing the capacity of the system thereby lowering the vertical stiffness of the system for increased vertical isolation. In such a system, the resilient washer-shaped elastomeric members also allow for communication between the gas chambers, via tubing running through the hole in the washer-shaped members, in addition to providing the rotational or rocking motion of the assembly.

DISCLOSURE OF PREFERRED EMBODIMENT

Other objects, features and advantages will occur to those skilled in the art from the following description of a preferred embodiment and the accompanying drawings, in which.

Figure 1:
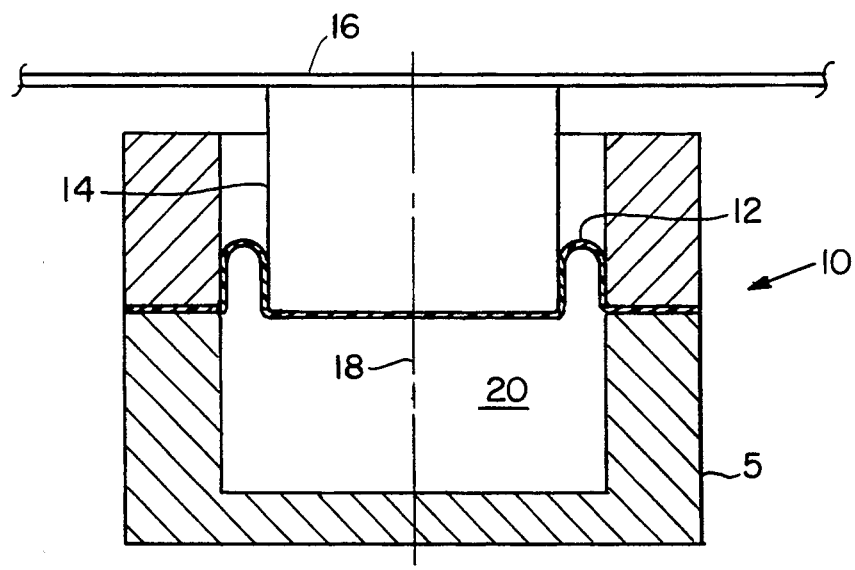
FIG. 1 is a schematic cross sectional diaphragm of a prior art apparatus used for vertical vibration isolation.

Conventional airspring assembly 10, FIG. 1, may include housing 5, a rolling convolution air seal 12, and piston 14 which supports vibration-free work station table top 16 often used for conducting delicate or critical measurements, etc. Vibrations received vertically by housing 10 in a direction along axis 18 will not be communicated to table top 16 because piston 14 is freely displaceable in the vertical direction and hence assembly 10 has a low stiffness in the vertical direction. The operating pressure, piston area, and volume capacity of chamber 20, governs the vertical stiffness of the system.

As discussed in the background of the invention, however, assembly 10 is inherently stiff in the horizontal direction. As a consequence, vibration isolation is significantly less efficient horizontally than for the vertical direction and horizontal displacement of housing 5 by vibrations which are transmitted to it may in turn be transmitted to table top 16.

Figure 2:
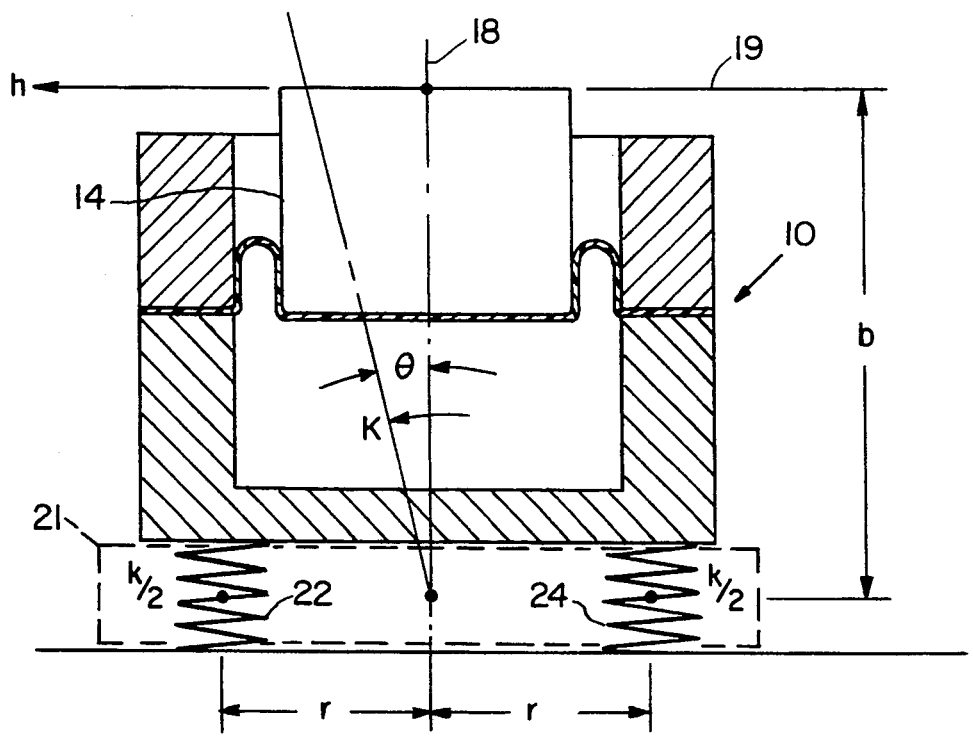
FIG. 2 is a schematic cross sectional conceptualized view of the reduced horizontal stiffness vibration isolation system according to this invention.

Using principles of dynamics, however, it can be shown that the horizontal stiffness h of the top of piston 14, FIG. 2, can be reduced by coupling pivot means 21, represented in FIG. 2 by coil springs 22 and 24, with assembly 10. Each spring 22 and 24 has a stiffness $k/2$ and are spaced at a radius $r$ from vertical axis 18. The center plane of pivot means 21 is at an elevation $b$ below the plane of the top of the piston 14, or the load support interface portion, where load will be supported (e.g., table top 16, FIG. 1). Mathematically then, the rotational stiffness $K$ of pivot means 21 is $K=kr^2$ and the effective horizontal stiffness $h$ at the top of piston 14 is $h=K/b^2=k(r/b)^2$. Therefore, it will be appreciated that the rotational stiffness $K$ of pivot means 21 directly effects the horizontal stiffness $h$ of assembly 10. Upon displacement of either pivot means 21 or piston 14 by vibrations other than along axis 18, springs 22 and 24 will allow a slight pivoting of assembly 10 which in turn reduces the horizontal stiffness $h$ at the top of piston 14 thereby achieving reduced horizontal stiffness in a vertical vibration isolation system otherwise inherently stiff in the horizontal direction.

A significant feature of this invention is that the piston and convolution are unconstrained vertically and thereby free to rotate about any horizontal axis independently of any coupled rotation of the airspring body during horizontal disturbance. This feature insures that a load supported on top of a multiple group or system of airspring isolators according to this invention can remain level and horizontal to the base and not be induced to rotate during horizontal disturbance.

Figure 3:
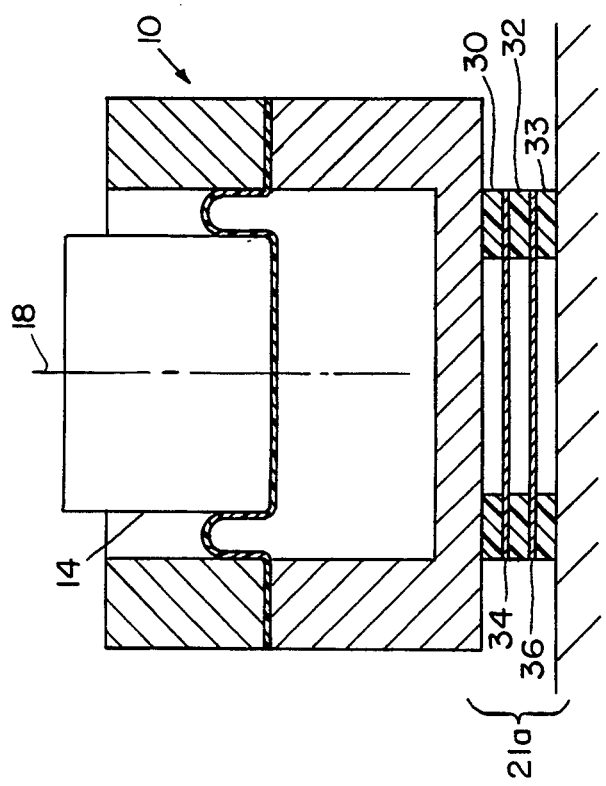
FIG. 3 is a schematic cross sectional view of one embodiment of the reduced horizontal stiffness vibration isolation system according to this invention.

Implemented as a series of resilient elastomeric washer type members 30, 32, 33 separated by rigid plastic or metal type members 34 and 36, FIG. 3, pivot means 21 will have the desired rotational stiffness to induce a pivoting or rocking motion of airspring assembly 10 relative to vertical axis 18 of airspring assembly 10 when either piston 14 or damper 21a is is displaced laterally or even in any direction other than along axis 18. Although a rolling convolution type flexible seal and piston arrangement is shown in this preferred embodiment, bellows type or other vertically displaceable springs could be coupled with rocking vibration damper or pivot means 21a employed in the manner herein described. Also, although washer-type members are shown, other configurations and arrangements could be utilized so long as the k,b and r parameters discussed in reference to FIG. 2 suitably provide the desired horizontal stiffness $h$ of the spring assembly along its horizontal axis 19 for a given application.

Figure 4:
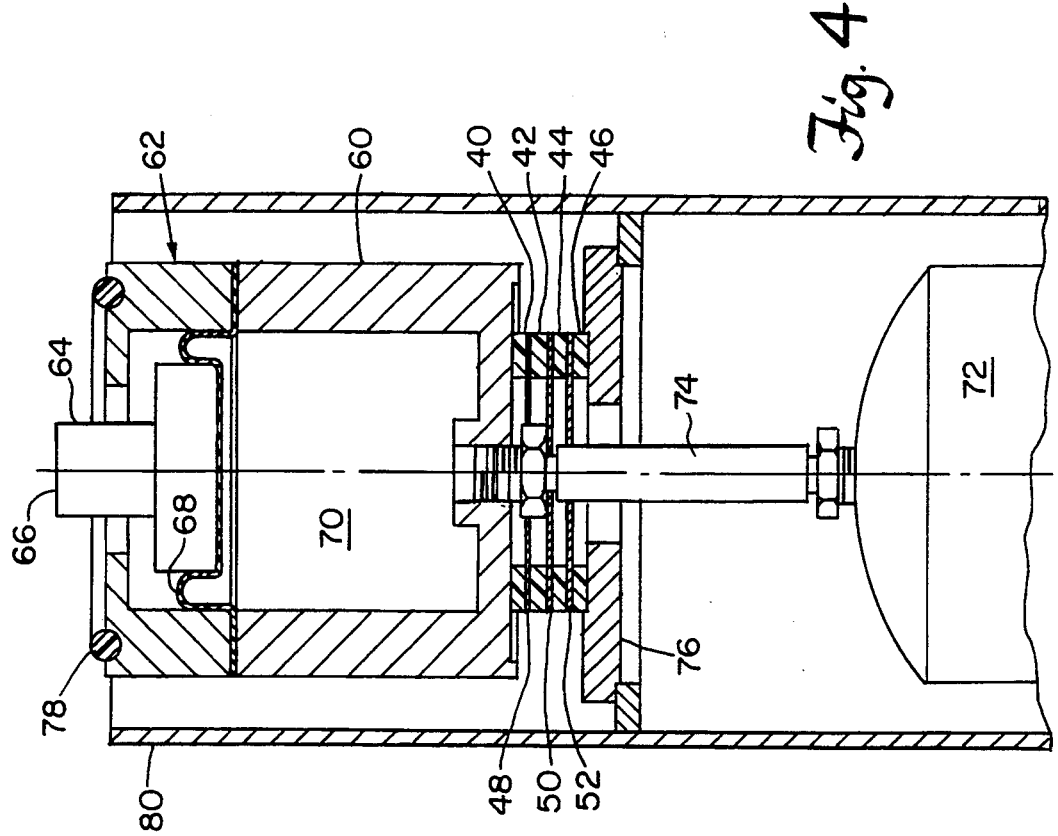
FIG. 4 is a schematic cross sectional view of a second embodiment of a reduced horizontal stiffness vibration isolation system according to this invention.

In a preferred embodiment there are four resilient neoprene washer shaped type pads 40, 42, 44, and 46, FIG. 4, each separated by rigid steel or aluminum discs 48, 50, and 52 Each pad may have a height of between 1/16-½, a 1-2" outside diameter and a ⅛-½" inside diameter for a 200 pound capacity airspring with a 3" outside diameter housing available from Kinetic Systems, Inc., 20 Arboretum Road, Box K, Boston, Mass 02131, Model No. 2212 or Series 0100. Alternatively, for a 4¾ diameter airspring housing with a 800 pound capacity, the pads may have a range of 2-3 ½" outside diameter and 1½" inside diameter. The geometry parameters for the steel or aluminum discs generally mirror those of the pads. Of course these parameters may be varied and different materials can be used to achieve a horizontal stiffness desired in any given system. Bonding material such as DEVCON#4404 cyonodrylate adhesive may be used to physically secure the pads and discs in this manner. Upper pad 40 is mounted to the housing 60 of airspring 62 which includes piston 64 having load support interface portion 66 and riding on rolling convolution air seal 68. First air cylinder 70 may be in communication with a second air chamber 72 via tubing 74 to further increase the volume of the system for increased vertical isolation. Washer-shaped type pads 40, 42, 44 and 46 thereby achieve the rotational and pivoting motion desired for reduced horizontal stiffness and also allow for communication between air cylinder 70 and second air chamber 72 via tubing 74. Lower pad 46 is securely bonded to rigid seat 76 with a high strength adhesive or epoxy. Finally, rubber O-ring stop 78 may be incorporated to prevent the load residing on interface 66 from striking housing 62 during severe vibrational disturbance. The whole assembly may be mounted within table leg 80 of a vibration isolation table (not shown) as will be understood by those skilled in the art.

Figure 5:
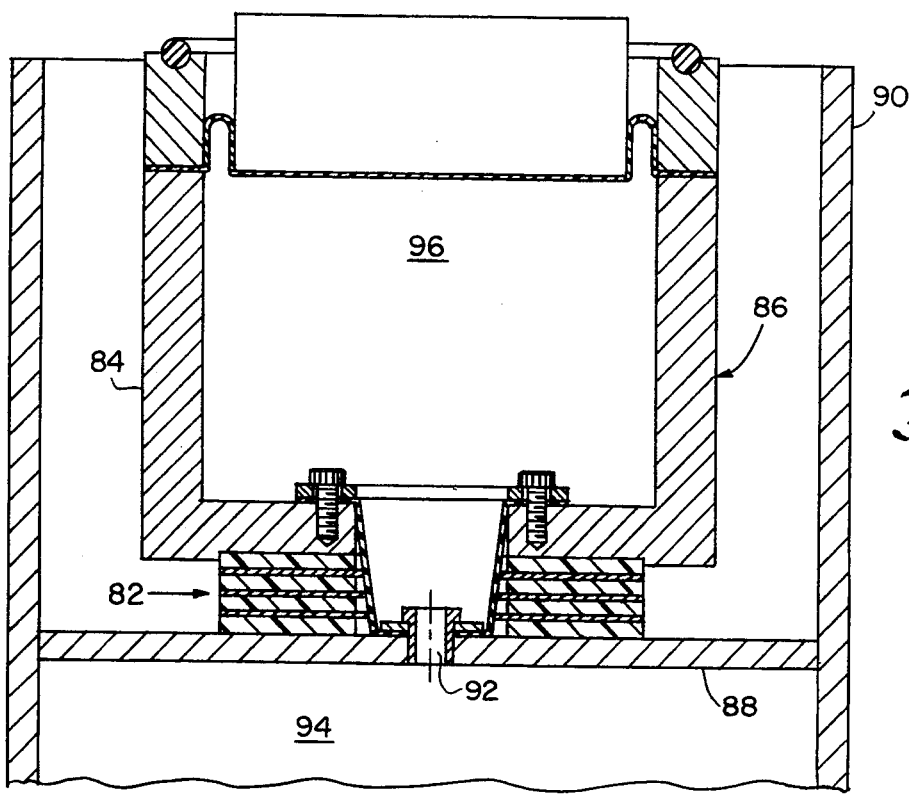
FIG. 5 is a schematic cross sectional view of a third embodiment of a reduced horizontal stiffness vibration isolation system according to this invention.

In another embodiment, the neoprene pad assembly 82, FIG. 5, is mounted partially within housing 84 of airspring assembly 86 which also allows for easy centering of the neoprene pad assembly which resides directly on member 88 of table leg 90. In this embodiment, opening 92 within pad assembly 82 allows communication between air chambers 94 and 96; air chamber 94 actually being a portion of table leg 90. Of course, many other air chambers and air or gas piston arrangements are possible and will be self evident by those skilled in the art.

Figure 6:
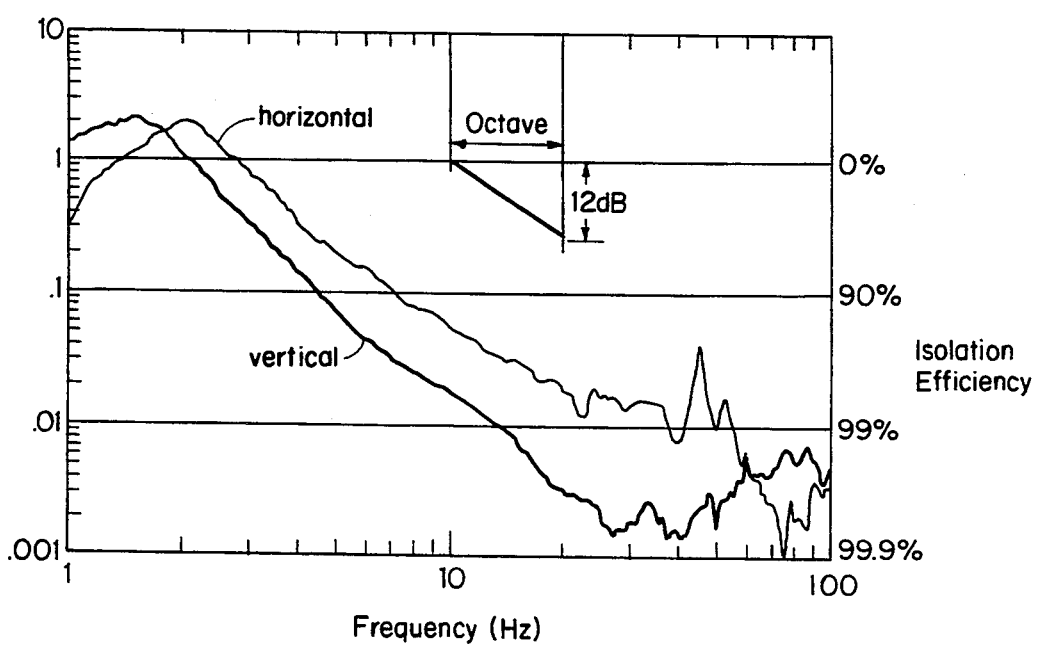
FIG. 6 is vibration performance data for the reduced horizontal stiffness vibration isolation system according to this invention.

Vibration transmissibility test results, FIG. 6, for the embodiment of the invention described in reference to FIG. 4 reveal that vibrations of a frequency greater than 2.5 Hz are effectively dampened and the system may achieve an efficient isolation rate of 12 db/octave. The horizontal resonant frequency is 2 Hz and in this case is only slightly higher than the vertical resonance of 1.5 Hz. Conventional airspring system 10, FIG. 1, would exhibit horizontal resonance between 6 to 8 Hz and thereby afford no vibration isolation below approximately 10 Hz.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A reduced horizontal stiffness vibration isolation system comprising:
a gas spring assembly having a vertical axis and including a load support interface portion and a rolling convolution type flexible gas seal and a piston receivable by said seal; and
pivot means, externally coupled to said gas spring assembly, for allowing said gas spring assembly to pivot when at least one of said load support interface portion and said pivot means is displaced in a direction other than along said vertical axis, to reduce the horizontal stiffness of the gas spring assembly.

2. The vibration isolation system of claim 1 in which said pivot means includes a plurality of elastomeric members.

3. The vibration isolation system of claim 2 in which said pivot means further includes rigid members disposed between each pair of elastomeric members.

4. The vibration isolation system of claim 2 in which said elastomeric members are washer shaped for further reducing the horizontal stiffness of the gas spring assembly.

5. The vibration isolation system of claim 3 in which said rigid members are washer-shaped.

6. The vibration isolation system of claim 1 in which said pivot means is partially receivable by said gas spring assembly.

7. The vibration isolation system of claim 1 in which said pivot means includes a resilient member for contributing to vertical and horizontal vibration isolation.

8. A reduced horizontal stiffness vibration isolation system comprising:
an airspring assembly including a housing, a first gas chamber, and a piston sealed from said first gas chamber by a rolling convolution type air seal, said piston including a load support interface portion; and
pivot means having opposing outer faces coupled to said housing at one said face for allowing said gas spring assembly to pivot when at least one of said load support interface portion and said pivot means is displaced in a direction other than along the vertical axis of the airspring assembly, to reduce the horizontal stiffness of the airspring assembly.

9. The vibration isolation system of claim 8 further including a second gas chamber in communication with said first gas chamber for increasing the capacity of said system to lower the vertical stiffness of said system for increased vertical isolation.

10. The vibration isolation system of claim 8 further including a rigid seat member mounted on the other said face of said pivot means.

11. The vibration isolation system of claim 8 in which said pivot means includes a plurality of elastomeric members separated by more rigid members.

12. The vibration isolation system of claim 11 in which said elastomeric members are washer shaped.

* * * * *